2 Sheets—Sheet 1.

A. A. GEHRT.
Cotton and Hay Press.

No. 220,019. Patented Sept. 30, 1879.

Attest:
C. Clarence Poole
F. L. Middleton,

Inventor:
A. Albert Gehrt
by Ellis Spear
Atty

A. A. GEHRT.
Cotton and Hay Press.

No. 220,019. Patented Sept. 30, 1879.

Attest:
R. F. Barnes
F. L. Middleton

Inventor:
A. Albert Gehrt
by Ellis Spear
Atty.

UNITED STATES PATENT OFFICE.

A. ALBERT GEHRT, OF QUINCY, ILLINOIS.

IMPROVEMENT IN COTTON AND HAY PRESSES.

Specification forming part of Letters Patent No. 220,019, dated September 30, 1879; application filed August 13, 1879.

*To all whom it may concern:*

Be it known that I, A. ALBERT GEHRT, of Quincy, in the county of Adams and State of Illinois, have invented an Improvement in Cotton and Hay Presses, of which the following is a specification.

My invention relates to presses for baling hay, broom-corn, cotton, moss, and like materials, and particularly to that class of presses in which the material to be compressed is forced into an obstructed, or partially obstructed, bale-chamber by the reciprocating action of beaters or followers, the bales being formed by sliding doors or partitions interposed at certain intervals, said bales being held sufficiently to compress the material, being allowed to pass out at the open end of the bale-chamber when sufficiently compressed.

The particular points which constitute my invention are hereinafter described, and indicated in the claims.

Figure 1:
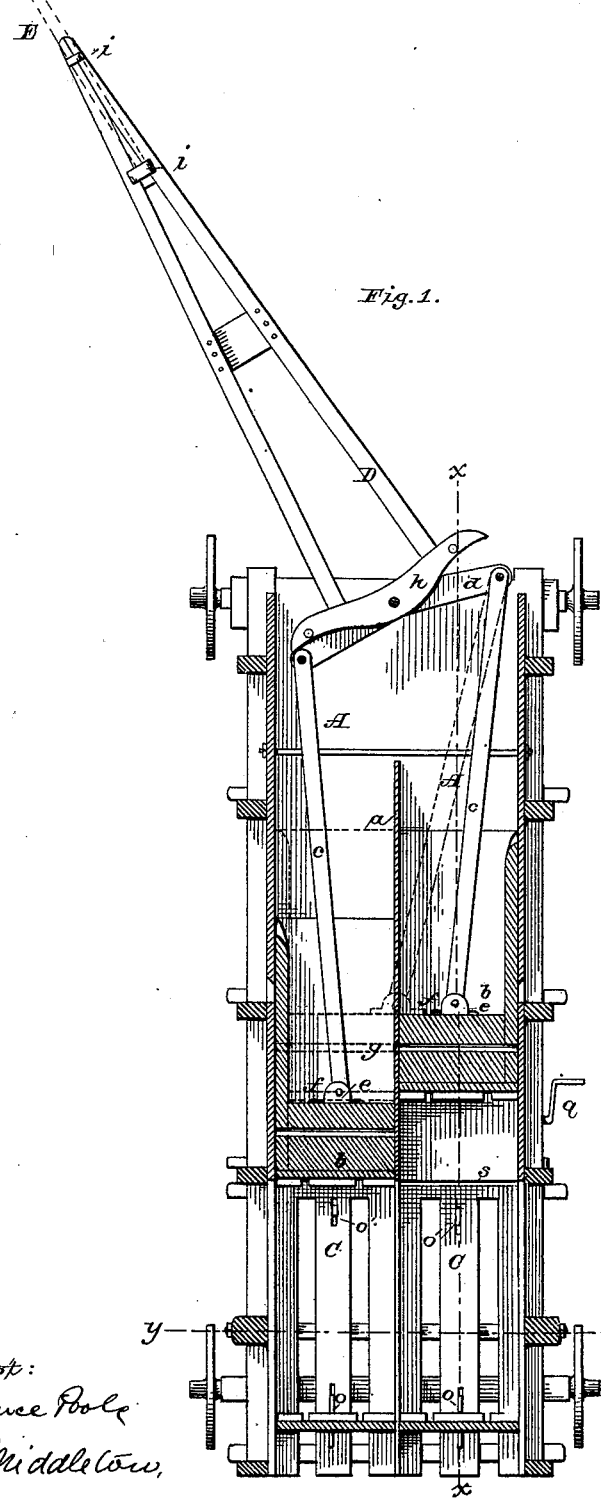
Figure 2:
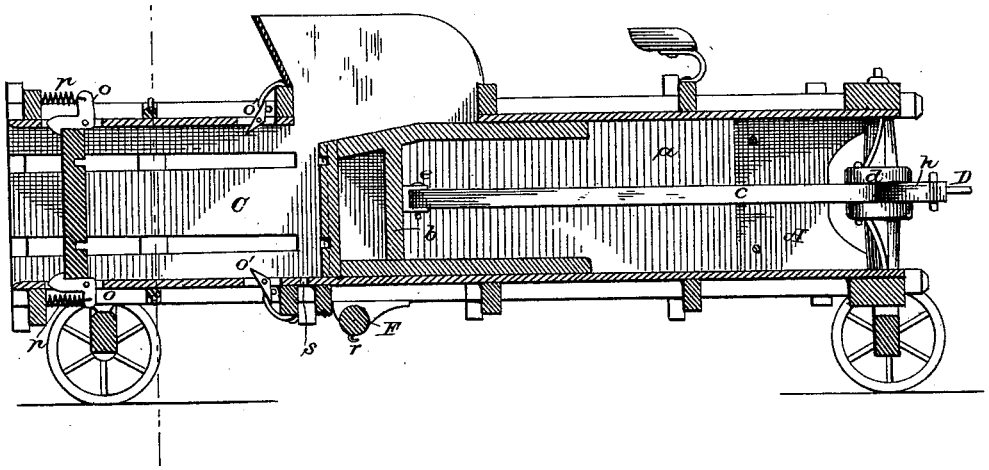
Figure 3:
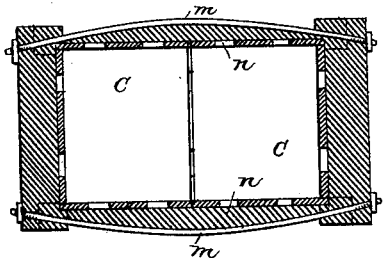

In the drawings hereunto attached, and forming part of this specification, Figure 1 is a horizontal section of my machine, and Fig. 2 a vertical section on line $x$ $x$ of Fig. 1. Fig. 3 is a transverse section on line $y$ $y$.

In the drawings, the guide-box is represented at A A, separated by a longitudinal vertical partition, $a$, which extends through the guide-box, and also through the bale-chamber C, dividing both into equal compartments. Within these compartments slide the reciprocating followers $b$ $b$. These followers, which may move independently, are connected by pitmen $c$ $c$ to a pivoted cross-head, $d$. The pitmen are attached to the followers, as shown at $e$, by means of ears, to which the ends of said pitmen are pivoted in such a manner that they may be readily removed. The blocks on which these ears are carried are bolted to the followers, as shown at $f$.

When the two followers $b$ $b$ are used separately, each operating independently of the other, in its own proper compartment, the pitmen are attached to each block, as shown in full lines in Fig. 1. When, however, it is desirable to compress the material into larger bales, the partition $a$ may be removed, and the two followers bolted together by means of the bolt $g$, passing through both. In that case one of the blocks which carry the ears may be bolted to the followers, as shown in the dotted line of Fig. 1, in a central position. One of the pitmen is then removed, and the other connected to the followers at the central point, as shown in the dotted lines in the figure last specified. The oscillating motion of the cross-head $d$ will then move both the followers as one follower, and the press will operate as a single-chambered press, whereas, when the two followers act independently, the machine operates as a double press, the material being compressed alternately, first in one chamber and then in the other.

The cross-head $d$ is operated through a double cam, $h$, which is pivoted within a slot, and provided with a lever or tongue, D, by means of which an oscillating movement is imparted to the double cam. This lever or tongue is provided with loops $i$ $i$, by means of which an extension, E, may be added in case it be found desirable to use only one horse.

The partition $a$ may be made of metal or any other suitable material, and is inserted in a slot, as shown in Fig. 3, in which it is firmly held, and from which it may be readily removed. It may, however, be held in place in other ways, well known to skilled mechanics. By means of this partition and the duplicate followers united to the common cross-head two bales may be compressed at the same time, and by the same power, and without any increased number of attendants.

Motion of the lever attached to the cross-head in one direction compresses the material in one chamber, while the reverse motion, which withdraws the first follower, advances the other, and compresses in the second chamber, and so on alternately.

There is thus no wasted movement of the power, and as the feed-holes are side by side, they may be attended by the same person. The partition between the feed-holes is also removable, and when the press is used as a single-chambered press, both partitions—that in the press and that between the feed-boxes—are removed, when the press is capable of compressing a large bale.

Fig. 3 shows a device for compressing the bale-chamber E. It consists of two rods, $m$ $m$, which pass over curved bars $n$ $n$, and are provided with nuts, by which they may be tightly drawn, to give any desired compression in the center of the bale-chambers, at which point these rods are applied.

By reason of the curved exterior surfaces of the cross-bars $n\ n$, it is plain that strain on the rods $m\ m$ will compress on all sides toward the center.

The bale-chamber is slotted on all sides, as clearly shown in the drawings, and the sliding heads or partitions are correspondingly grooved, so that the bales can be hooped either from the sides or top. These sliding partitions fit snugly, so that at the center, where the compressing-rods are applied, there is friction enough to press against in order to compact the bales.

Near the end, and midway of each chamber, above and below, is a yielding catch, as shown in Fig. 1. It consists of a catch, $o\ o$, pivoted in a slot, with a spring, $p$, connecting the outer end of the catch with the cross-bar. The catches are so made that they may be forced into the slots and allow the sliding doors to pass out; but the amount of resistance, and, consequently, of pressure, depends on the strength of the springs $p$. Such spring-catches may also be used at the front of the bale-chamber, as at $o'\ o'$.

To provide for material which requires canvas I have added underneath the bale-chamber, near where it joins the guide-box, a roller, F, extending across the press. It has a crank, $q$, and hooks $r\ r$, which hold the end of the canvas or other cloth wound upon the roller. A slot, $s$, Figs. 1 and 2, admits the canvas to the bale which is to be inclosd.

My improved press, in the respects described, is cheap to manufacture, serves well for many different kinds of material, and is simple in construction.

Having thus described my invention, what I claim as new, and desire to secure by Letters Patent, is—

1. A baling-press consisting of a guide-box and bale-chambers divided into two parallel compartments, in combination with the followers, connected to a common cross-head, and operating as set forth.

2. In a baling-press of the described kind, the combination of the duplicate followers, connected to a common cross-head, and adapted to be connected to each other and move together, and of a removable partition, as set forth.

3. In combination with the press having removable partitions and duplicate followers, a duplicate feed-box with removable partitions, as set forth.

4. In combination with the pitmen, the slotted cross-head and double-cam-carrying extensible lever, as set forth.

5. In combination with the bale-chamber, the curved bars $n$, and the rods $m$, having tightening-nuts, substantially as and for the purposes set forth.

In testimony whereof I have signed my name to this specification in the presence of two subscribing witnesses.

A. ALBERT GEHRT.

Witnesses:
C. ELLEBRECHT,
CHARLES MENES.